United States Patent [19]

Ebira

[11] Patent Number: 5,174,430
[45] Date of Patent: Dec. 29, 1992

[54] DISTRIBUTING AND COLLECTING DEVICE FOR CONVEYED PRODUCTS

[75] Inventor: Shusaku Ebira, Osaka, Japan

[73] Assignee: Tetra Alfa Holdings SA, Pully, Switzerland

[21] Appl. No.: 775,108

[22] Filed: Oct. 11, 1991

[30] Foreign Application Priority Data

Oct. 11, 1990 [JP] Japan .................. 2-273006

[51] Int. Cl.5 ............................................. B65G 47/30
[52] U.S. Cl. ........................... 198/418.5; 198/419.1; 198/442
[58] Field of Search ............... 198/418.5, 418.7, 419.1, 198/436, 437, 442; 414/791.6, 792

[56] References Cited

U.S. PATENT DOCUMENTS

| | | | |
|---|---|---|---|
| 3,193,078 | 7/1965 | Amenta et al. | 198/442 X |
| 4,610,347 | 9/1986 | Inoko | 198/418.7 |
| 4,723,649 | 2/1988 | Hartness et al. | 198/442 |
| 4,846,336 | 7/1989 | Hoyland et al. | 198/436 X |

FOREIGN PATENT DOCUMENTS

| | | | |
|---|---|---|---|
| 2433375 | 4/1980 | France | 198/442 |
| 46-27334 | 9/1971 | Japan . | |
| 61-64627 | 4/1986 | Japan . | |

Primary Examiner—Robert P. Olszewski
Assistant Examiner—Cheryl L. Gastineau

[57] ABSTRACT

A distributing and collecting device for conveyed products includes a wire conveyor, a conveyance-direction sorting guide, a product-distributing device with a distributing vertical conveyor, a first gate and a second gate. The conveyed articles can be tall, thin articles such as drink cartons. The products are sequentially fed by a supply, vertical conveyor through the conveyance-direction sorting guide over the wide conveyor. The conveyance-direction sorting guide can shift the articles from side to side of the wide conveyor in a direction perpendicular to the conveying direction. The articles are fed by the product-distributing device and distributing vertical conveyor to a row in front of the first gate. When a prescribed number of products fills a row, the product-distributing device will move to fill an adjacent row. Just before all rows are filled, the first gate is opened and the products move over the wide conveyor to the second gate. This second gate can eventually be opened to feed products to downstream processing such as a shrink-packaging machine.

18 Claims, 4 Drawing Sheets

DISTRIBUTING AND COLLECTING DEVICE FOR CONVEYED PRODUCTS

BACKGROUND OF THE INVENTION

1. Field of the Invention

The present invention relates to a distributing and collecting device for conveyed products such as liquid food packs. The products are initially conveyed single file and distributed into a prescribed number of rows. After the rows are filled, the groups of collected products are then conveyed to a downstream treatment device such as a shrink-packaging device.

2. Description of the Background Art

Conventionally, in order to collect multiple products in sets, if the products are parallelepiped tubes such as liquid food packages, a device has bene used in which vertical conveyors are established on both sides of the end of the carrier conveyor. These vertical conveyors run more slowly than the carrier conveyor thereby applying a braking force to both sides of the products that are conveyed one after another to narrow the gaps between them so as to have the products contact each other. When a certain amount of the products are discharged, the vertical conveyors are temporarily stopped so that a row of discharged products that are stopped on the carrier conveyor in the mutually contacted condition are pushed in the direction perpendicular to the running direction using a pusher. These actions are repeated for a prescribed number of times so that the products are distributed into a prescribed number of rows in sets of a fixed amount and collected as seen, for example, in FIG. 1 of Tokkaisyo 61-64627.

Another device, which does not use a pusher, directs a row of conveyed products between parallel guides that oscillate horizontally on a wide conveyor. The products are distributed into multiple rows in sets of a fixed amount and are stopped to be collected Such a device is shown in FIG. 1 of Jikkosyo 46-27334 where products (bottles With a flat circular section) are distributed and collected, in which the products are distributed by parallel guides that oscillate on a wide conveyor and are stopped by an unillustrated stopper gate.

Among the conventional collecting devices, the above-mentioned conventional collecting device using a pusher has the following problem that after a row of a prescribed number of products (such as packages in sets of four) are discharged via vertical conveyors at the end of the carrier conveyor and are stopped on the following conveyor, these products are pushed transversely (in the direction perpendicular to the running direction of the conveyor), such that a space has to be recovered for the next row to place the row in front of the pusher to be pushed. This inevitably produces a time loss and since the above action has to be repeated several times in order to collect products, the collecting speed cannot be increased.

The latter device, which employs guides that horizontally oscillate on a wide conveyor to distribute products into a prescribed number of rows in sets of a fixed amount and which stops the products to be collected using a stopper gate has the problem that it is difficult to increase the collecting speed. After a prescribed number of products are collected in multiple rows and discharged, the stopper gate is used again to continually stop and collect the products that are distributed. If the collecting speed is increased, the products tend to accumulate in front of the gate, thereby preventing accurate distribution of the products.

SUMMARY OF THE INVENTION

In order to achieve the above-mentioned purpose, the distributing and collecting device for conveyed products of the present invention distributes and collects products that are supplied from a carrier conveyor one after another into a prescribed number of rows in sets of a fixed amount. This device has a wide conveyor, a conveyance-direction sorting guide, product-distributing means, a first gate and a second gate. The front end of the wide conveyor is connected to the end of the carrier conveyor, extends to the product-distributing and collecting area, and is wide enough to carry a prescribed number of rows of products. The conveyance direction sorting guide has, near the upper surface of the above-mentioned wide conveyor, a front end for receiving products from the above-mentioned carrier conveyor and a rear end for discharging the products. The rear end side of the conveyance direction sorting guide is capable of oscillating.

The product-distributing means consists of a mutually facing pair of vertical conveyors above the wide conveyor. The front ends of the vertical conveyors are connected to the rear end of the above-mentioned guide. The vertical conveyors convey the products in the conveyance direction by sandwiching them at about the same speed as the wide conveyor, in such a manner that when the vertical conveyors discharge a prescribed number of products from the end row position, the discharging part of the product-distributing means moves to a row position adjacent the current row position in sequence. In other words, the product-distributing means moves reciprocally between the rows to discharge the products.

The first gate opens or closes perpendicularly to the conveyance direction above the wide conveyor at a prescribed distance from the above-mentioned product-distributing means and the second gate is established at a prescribed distance from the first gate in such a manner that it can move up and down to block the products on the wide conveyor. After the products are temporarily stored in multiple rows in sets of a fixed amount at the first gate, the gate opens and the second gate distributes and collects the products into multiple rows in sets of a fixed amount.

In the above distributing and collecting device for conveyed products, it is more effective if the first gate opens to the left and right, and if the first gate and the second gate are driven in such a manner that the moving of the vertical conveyors causes products to be discharged from either end row position of the above-mentioned multiple rows and accumulated one after another at each row position in a prescribed manner. When the products are accumulated at a row position preceding another end row position, the first gate opens and at the same time a prescribed number of rows of products pass the gate so that when a prescribed number of products are accumulated at the second gate, it is detected and the first gate is closed. In turn, products are supplied one after another from the other end row position. On the other hand, the second gate opens to let the accumulated products move to the next line so that when a prescribed number of products are all transported, the second gate rises to stop the following products.

It is also preferable that the side conveyor consists of multiple rows of small diameter rollers comprising mutually adjacent shafts and multiple peripheral rollers. The shafts are established perpendicular to the conveyance direction and are rotated and driven in the conveyance direction. The multiple peripheral rollers are joined to the above-mentioned shafts in such a manner that they can rotate by friction.

It is also preferable that the distributing and collecting device for conveyed products has a product-distributing means comprising a pair of mutually facing vertical conveyors and optical sensors. The conveyors established above the wide conveyor in such a manner that they can move in the direction perpendicular to the conveyance direction of the wide conveyor, and the optical sensors are located so that their light path crosses the product-discharging end. When the optical sensors detect a prescribed number of products, the discharging part of the vertical conveyor moves to the row position adjacent to the current one in the above-mentioned multiple rows.

It is further preferable if the conveyance-direction sorting guide is equipped with mutually facing hinges at the front end and rear end so that the distance between the front end and rear end can be varied. Further, a combination of pipes and shafts are used to accommodate pivoting of the sorting guide.

When the distributing and collecting device for conveyed products described above is connected at the end of the single-row product-carrier conveyor to feed products such as liquid food packages from the carrier conveyor, the products are fed into the front end of the conveyance-direction sorting guide. The rear end of the sorting guide is capable of oscillating on the wide conveyor that is connected to the end of the carrier conveyor. At this time, the conveyance direction of the products is changed according to the oscillated position of the guide, and the products are fed into the pair of mutually facing vertical conveyors, i.e., the product-distributing means that is established downstream of the wide conveyor. The products conveyed into the vertical conveyors through the conveyance-direction sorting guide are sandwiched by the vertical conveyors that move at about the same speed as the running speed of the wide conveyors so as to control discharging of the products into the proper row position.

The vertical conveyors move back and forth between the multiple rows into which products are distributed, in such a manner than when a prescribed number of products are discharged at one end row position, the vertical conveyors stop discharging the products and the product-discharging part moves to the next row in sequence. In this case, the products are first accumulated in multiple rows each having a prescribed number of products in front of the first gate. The products are temporarily blocked by the first gate before they are collected at the second gate. When increasing the distributing speed to increase the collecting speed, conveyed products are therefore distributed and collected into a prescribed number of rows each having a prescribed number of products much faster than compared to devices using only a gate. In these cases, products are added to other products that were conveyed previously and accumulated into a prescribed number of rows in sets of a prescribed number of products in front of the gate and blocked there.

By opening the first gate from the center toward the left and right side, a long-stroke cylinder which is required of a single-flap opening gate is not necessary. Also, by arranging the first gate to open when the products are accumulated up to the row position next to the last row position where products are to be accumulated, a prescribed number of products in the last row, i.e., the end row of the multiple rows, are conveyed to a wide conveyor without being blocked by the first gate. Therefore, the products that are distributed and accumulated in front of the first gate can be pushed out to the second gate faster, allowing the second gate to collect them faster. Also, by opening the first gate simultaneously in the left and right directions and by making the second gate rise from the lower position to block the products, the bottom surface of the product would not go further than the upper surface of the product as in the case when the gate comes down from above. Accordingly, the gate falling down onto the products is prevented.

The wide conveyor conveys the products through the conveyance-direction sorting guide to the second gate where the products are finally collected. The wide conveyor comprises multiple rows of small-diameter rollers that are placed perpendicular to the conveyance direction and adjacent to each other to be rotated and driven. Each small-diameter roller consists of a shaft and multiple peripheral rollers that are joined so as to be able to rotate by friction.

The wide conveyor is effective in conveying especially slim and tall packages with a relatively small bottom such as drink packages. This is for two reasons. First, the bottoms of the conveyed products receive forwarding action caused by rotational driving force with multiple linear contact with the conveyor. Secondly, when the conveyed products stop or start on the conveyor and inertia will tend to push the conveyed products, frictional influence between the bottoms of the products and the surface of the conveyor is reduced because of the linear contact therebetween and because of slipping at the frictional joint between the roller and the shaft. Therefore falling of the products is prevented.

The pair of vertical conveyors (i.e., the product-distributing means) discharges a prescribed number of products through the discharging part. The discharging part moves to the next row position in sequence so that it moves back and forth between the above-mentioned multiple rows. In this case, by establishing the vertical conveyors on the wide conveyor in a movable manner perpendicular to the conveyance direction, products can be more smoothly discharged to the gate and accumulated faster than the case using a conventional oscillating guide in which the product-discharging part moves along an arc while changing angles, under the same condition. This is especially true when the cross section of the product is rectangular. By establishing optical sensors in such a manner that their light path is positioned at the product-discharging end of the vertical conveyors and arranging the discharging part to move to the next row of the multiple rows when a prescribed number of products are detected, movement of the vertical conveyors is smoothly controlled by counting how many times the light path between the optical sensors is disturbed. Therefore, the number of products discharged is known.

Furthermore, the conveyance-direction sorting guide that is established so that the distance between its front end and the rear end can be stretched or shortened by combining pipes and shafts, extends and smoothly leads the products from the guide to the vertical conveyors, i.e., the product-distributing means. This occurs even when the guide oscillates and the vertical conveyors are positioned at the end row position of the above-mentioned multiple rows, if the vertical conveyors are established in such a way that they can move in the direction perpendicular to the running direction of the wide conveyor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 11:
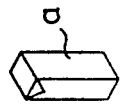
FIG. 11 is a perspective view of an example of a product distributed and collected in the present invention.
Figure 12:
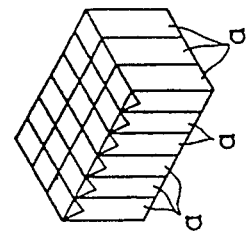
FIG. 12 is a perspective view of an example of products distributed and collected tightly together by the present invention.

An embodiment of the present invention will now be described with reference to the accompanying drawings. As seen in FIG. 11, a product a (drink pack) is shown. These products a are distributed and collected in an aggregate of 3 columns × 6 rows as shown in FIG. 12. In other words, the device of the present invention distributes products into six rows of three items each. Small gaps that are made between the rows are eliminated using guides, etc., that are located on the left and right of the aligned and collected products of six rows when pushing them out to the next line. Therefore, every package contacts each other. The collected packages can be grasped by a U-shaped blank and moved to a prescribed after treatment (such as shrink-packaging, etc.) after being discharged from the instant device.

Figure 1:
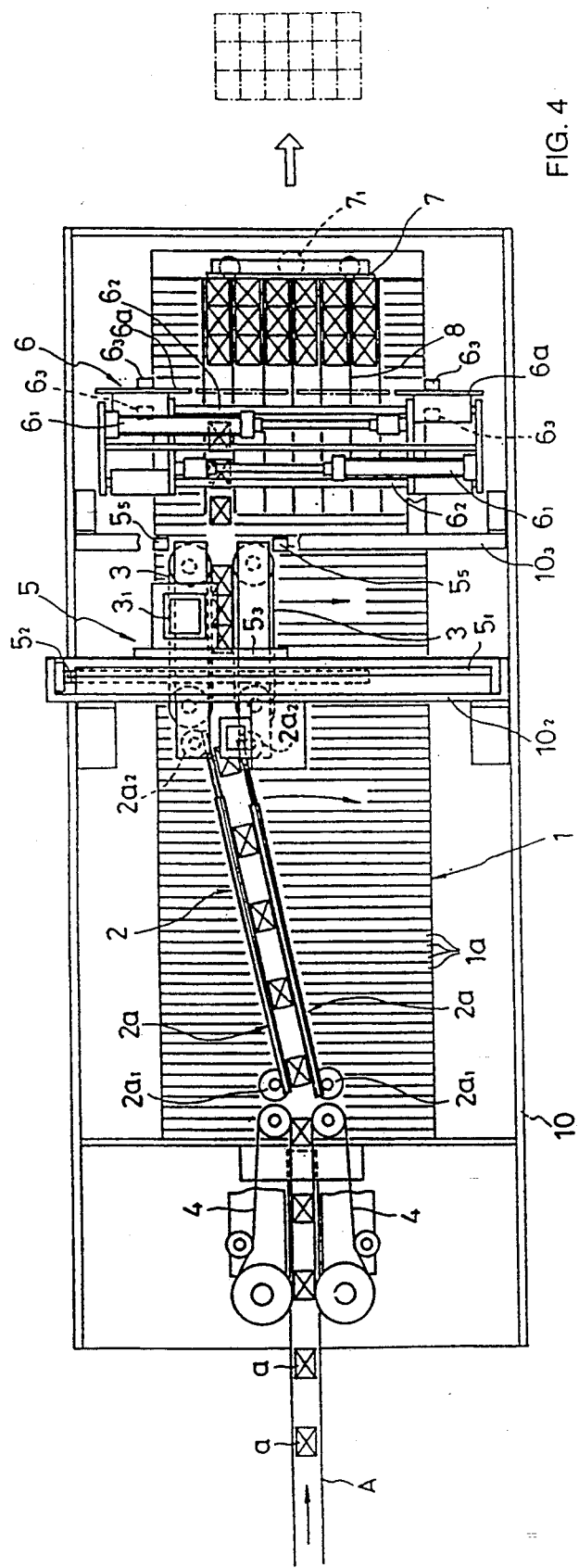
FIG. 1 is a plan view of the distributing and collecting device of the present invention.
Figure 2:
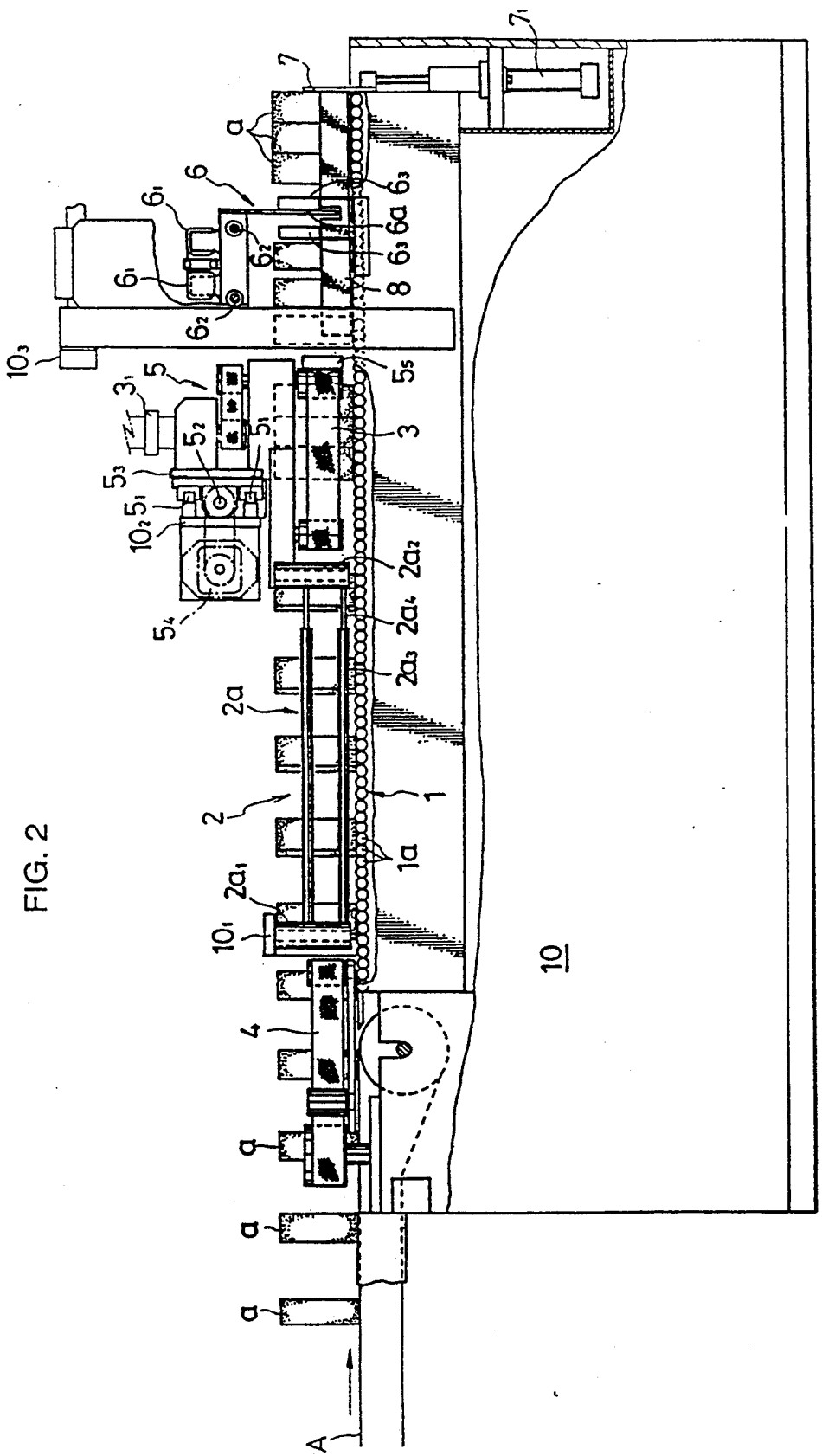
FIG. 2 is a side view of FIG. 1.
Figure 3:
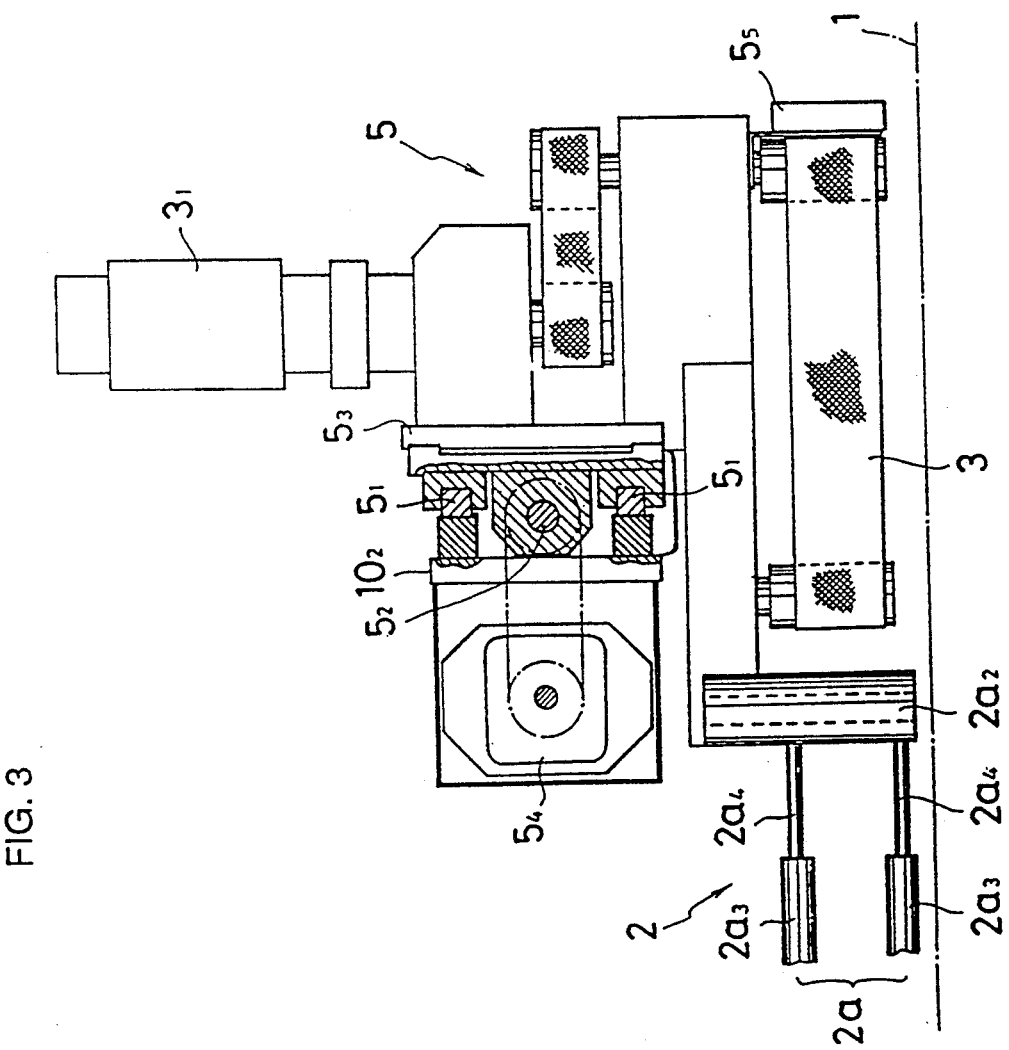
FIG. 3 is a partially enlarged side view of a product-distributing means of the present invention.

FIGS. 1 and 2 depict a plan view and a side view of the entire device, in which the products a supplied one after another on the carrier conveyor A go through the vertical conveyors 4,4 that are established on both sides of the end of the carrier conveyor A to control supply of the products going downstream. More specifically, when the conveyors 4,4 stop feeding the products a, supply of the sandwiched products a to the distributing and collecting device downstream is stopped, and when the conveyors 4,4 are driven, the products are continuously supplied to the front end opening of the conveyance-direction sorting guide 2 of the distributing and collecting device. Accordingly, the supply of the products a is finely attuned to the working condition (i.e., distributing and collecting condition or occurrence of troubles, etc.) of the distributing and collecting device.

Figure 4:
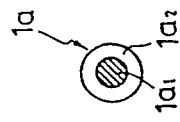
FIG. 4 is an enlarged sectional view of a small diameter roller than constitutes part of a wide conveyor of the present invention.

Below and downstream from the product-discharging part of the mutually facing vertical conveyors 4,4, a wide conveyor 1 of a prescribed width is provided. This wide conveyor 1 can convey multiple rows of products. The wide conveyor 1 extends to the immediate front of a second gate 7 (to be described later) for product-collecting at a prescribed height on the main body frame 10. The wide conveyor 1 consists of multiple rows of small-diameter rollers $1a$. Each roller has a shaft $1a_1$ that is arranged perpendicular to the conveyance direction and arranged one next to another and is rotated and driven in the conveyance direction (clockwise in FIG. 2). A peripheral plastic roller $1a_2$ is provided around the shaft, as seen in FIG. 4. The shaft $1a_1$ and roller $1a_2$ are mutually joined by friction so as to be able to rotate relative to one another.

When tall products a with a relatively tall height compared to the bottom area are conveyed, the influence of friction between the bottom of the product and the surface of the conveyor (horizontally applied force on the bottom) is reduced when the product a starts or stops because of slippage between the shaft $1a_1$ and the peripheral roller $1a_2$ and because of linear contact between the roller surface and the bottom of the product. The products are thereby prevented from falling.

Adjacent to the product-discharging outlet of the pair of mutually facing vertical conveyors 4,4 for the above-mentioned supply control, the front ends of mutually facing side guide parts $2a$, $2a$ that define the conveyance-direction sorting guide 2 face each other with a distance just a little longer than the width of the product a between them. The guide parts $2a$, $2a$ are suspended by hinge-joints $2a_1$, $2a_1$ at the frame board 10 that is horizontally mounted on the main body frame $10_1$ above the wide conveyor 1. The rear ends of the side guide parts $2a$, $2a$ of the sorting guide 2 are connected to the entrance of the vertical conveyors 3,3 and are established on the main frame 10 over the wide conveyor 1 at a prescribed distance from the product-discharging outlet of the above-mentioned supply control vertical containers 4,4 in such a manner that they can move perpendicularly to the conveyance direction on the product-distributing means 5.

In other words, the rear end of the sorting guide 2 is joined by hinges $2a_2$, $2a_2$ at positions adjacent to the entrance of the pair of vertical conveyors 3,3. These vertical conveyors 3,3 and guide parts 2a,2a are established so as to hang from above over the wide conveyor 1 to transport products while sandwiched between their sides. When the vertical conveyors 3,3 move perpendicularly to the conveyance direction of the wide conveyor 1, the above-mentioned mutually facing side guide parts 2a, 2a guide the conveyed products a between the side guide parts 2a, 2a that face each other and oscillate around front end hinge parts $2a_1$, $2a_1$. Thus, the products are led into the entrance of the pair of mutually facing vertical conveyors 3,3 of the product-distributing means 5.

Each of the side guide parts 2a, 2a, consists of a vertically arranged pair of pipes $2a_3$ and shafts $2a_4$ that are inserted into the pipe holes so that they can extend or shrink freely. In other words, pipes $2a_3$ and shafts $2a_4$ can telescope in order to accommodate movement of the sorting guide 2. Therefore, movement of the conveyance line of the vertical conveyors 3,3 of the product-distributing means 5 can be accommodated to either extreme end position of the wide conveyor I. The distributing line is allocated in three rows both left and right of the center of the above-mentioned carrier conveyor A. The side guide parts 2a, 2a stretch to smoothly lead the products a from the guide to the space between the vertical conveyors 3,3.

The product-distributing means 5 that is located downstream of the guide 2 and linked with the rear end of the conveyance-direction sorting guide 2 is established above the wide conveyor 1 on the main body frame 10 so as to straddle over the wide conveyor 1. More specifically, at the distributing means 5, a pair of vertical conveyors 3,3 are horizontally movable via a moving part $5_3$ that is moved in the direction perpendicular to the conveyance direction by a ball screw $5_2$. Ballscrew $5_2$ is guided by a pair of rails $5_1$, $5_1$ parallel to a frame board $10_2$ mounted horizontally on supports on both sides of the conveyance direction (i.e., above and below in FIG. 1) of the wide conveyor 1. The ball screw $5_2$ is driven by a motor $5_4$. The vertical conveyors 3,3 are driven at about the same speed as the conveyance speed of the wide conveyor 1. The conveyors 3,3 will control discharging of products a that were conveyed via the conveyance-direction sorting guide 2 to the proper rows by sandwiching them between the mutually facing vertical sides 3,3.

On both sides of the product-discharging outlet of vertical conveyors 3,3, a pair of optical sensors $5_5$, $5_5$ are provided in such a way that the light path crosses the product-discharging outlet. When three products are discharged and pass the light path, the sensors $5_5$ detect that and accordingly the transporting path of the vertical conveyors 3,3 moves to the adjacent row position. After the products are discharged at the end row position, an unillustrated means moves the transporting path backward and the products continue being counted and discharged one row after another. When starting the operation, an unillustrated button is used to move the above-mentioned vertical conveyors 3,3 to the extreme end row position (leftmost position in the embodiment) and to start discharging of the products a.

Downstream of the above-mentioned product-distributing means 5 and above the wide conveyor 1, there is established the first gate 6. This gate 6 consists of flaps 6a, 6a that open to the left and right from the middle and are vertically hung from a frame board $10_3$. This frame board $10_3$ straddles over the wide conveyor 1 at a prescribed distance from the conveyor surface. The flaps 6a temporarily stock the products to be distributed at a prescribed distance from the discharging outlet of the vertical conveyors 3,3 of the product-distributing means 5. The flaps 6a,6a of the gate 6 are separately driven by cylinders $6_1$, $6_1$, and are opened or closed while being guided by guide rods $6_2$, $6_2$. On both sides of the wide conveyor 1, optical sensors $6_3$, $6_3$ are established near the front or rear of the flaps 6a,6a in order to detect passing of the products.

The end of the wide conveyor is located at a prescribed distance downstream of the first gate 6. A second gate 7 of a prescribed width is located so as to almost contact the end of conveyor 1. A very small gap is provided for the second gate 7 to ascend from below the wide conveyor 1 to a prescribed height by a cylinder $7_1$. The conveyed products will be collected into six rows each having three items in front of the second gate 7.

Thin partitions 8 of a prescribed height are established on the wide conveyor 1 from a place just downstream of the area where the above-mentioned product-distributing vertical conveyors 3,3 move, up to the immediate front of the second gate 7 with a prescribed distance between them to partition products that are discharged and distributed by the vertical conveyors 3,3.

The device of the present invention, which is constructed as described above, distributes and collects products a that are conveyed in a single row in the following manner. When the device starts operation, products a that are supplied one after another by the carrier conveyor A are loaded onto the wide conveyor 1 via vertical conveyors 4,4 that control product supply. The products are guided through the conveyance-direction sorting guide 2 to the entrance of the mutually facing vertical conveyors 3,3 of the product-distributing means 5. These vertical conveyors 3,3 control discharge of products to each row position downstream for distribution.

When a prescribed number of products (i.e., three) are discharged, they are blocked temporarily during which time the discharging part moves to the next row position where discharging of the products resumes. The products are distributed into one row after another as the vertical conveyors 3,3 move perpendicularly to the conveyance direction. When the operation starts, an unillustrated start button is used to place the transporting path of the vertical conveyors at the extreme end row position (leftmost position relative to the conveyance direction) to start distributing products into rows of three items each.

Figure 5:
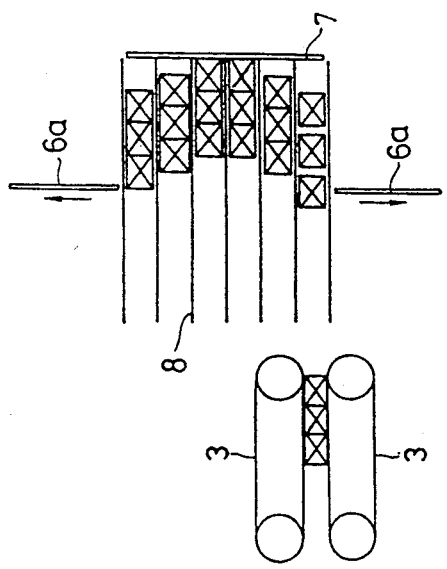
FIG. 5 is a plan view showing a starting sequence for distributing a prescribed number of products in relation to a first gate in the present invention.
Figure 6:
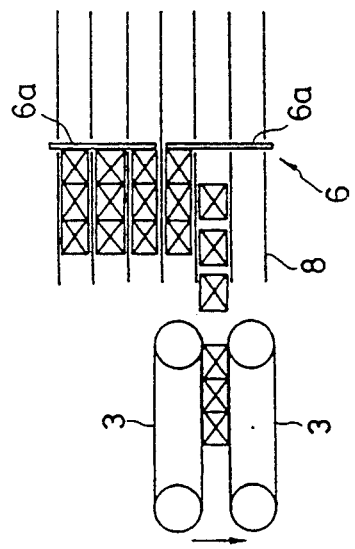
FIG. 6 is a plan view showing distribution of the prescribed number of products before the first gate is opened in the present invention.
Figure 7:
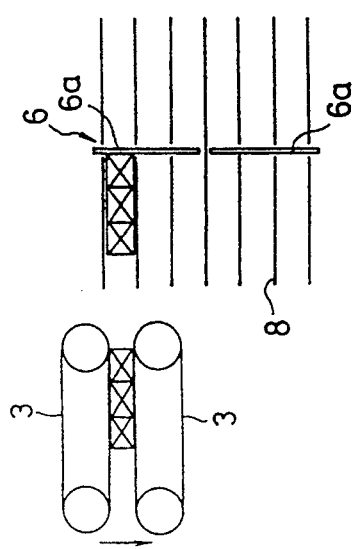
FIG. 7 is a plan view showing distribution of the prescribed number of products after the first gate is opened in the present invention.

More specifically, when the discharging outlet of the vertical conveyors 3,3 discharges three products at the leftmost position of the conveyance direction of the wide conveyor 1, the discharging action is temporarily stopped, while the three discharged products are blocked at the door panel 6a of the first gate 6, which is closed at the start of the operation. The vertical conveyors 3,3 then move to the next row position as seen in FIG. 5. The conveyors 3,3 continue moving on to the adjacent position every time three products are discharged. When a row just before the sixth row is filled, i.e., the fifth row from the left end is filled as seen in FIG. 6, the door panels 6a, 6a of the first gage 6 open to the left and right. At this time, products a are moved starting from the middle rows (i.e., the third and fourth rows from the left end). The products in the sixth row (in the rightmost row position) go through the first gate 6 without being blocked by the door panel 6a as seen in FIG. 7.

Figure 8:
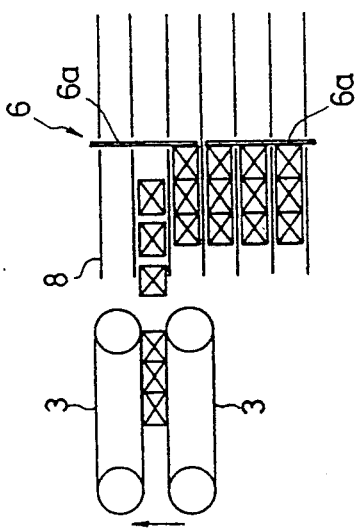
FIG. 8 is a plan view showing distribution of the prescribed number of products as the first gate is closing and before a second gate is opened in the present invention.

After the six rows of three products each pass the first gate 6, the light path of the optical sensors $6_3$, $6_3$, which are established close to the front and/or rear of the first gate $6_3$, $6_3$ turn ON, and the first gate 6 starts closing. At the same time a new row starts to be filled as seen in FIG. 8. At this time, the second gate 7 descends to be in the open position and the products a that are collected in six rows of three items each are conveyed to the next line where an unillustrated U-shaped blank grasp them and moves them to the shrink-packaging machine as indicated by dotted lines in FIG. 1.

Figure 9:
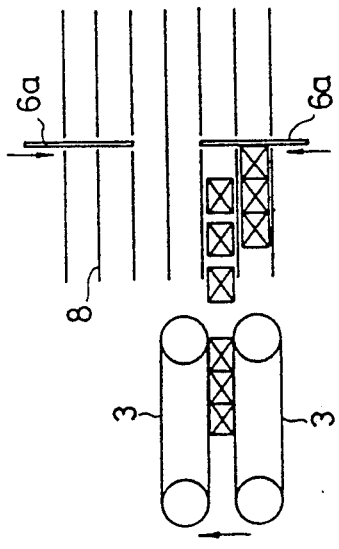
FIG. 9 is a plan view showing distribution of the prescribed number of products as the first gate is closing and after the second gate is opened in the present invention.
Figure 10:
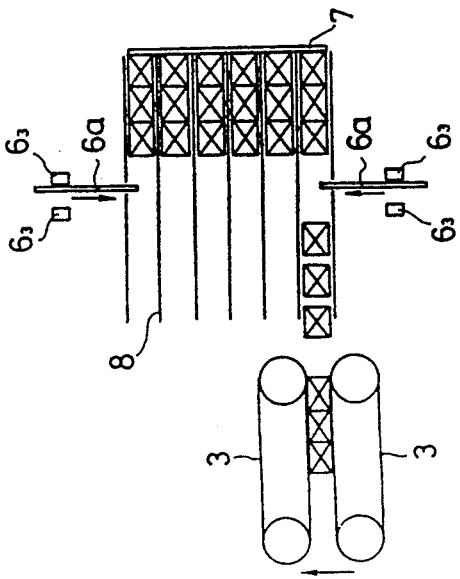
FIG. 10 is a plan view showing distribution of the prescribed number of products after the first gate is closed in the present invention.

After that, rows of three pieces each are made one after another in the reversed direction as seen in FIG. 9. When the fifth row from the right end is made as seen in FIG. 10, the first gate 6 opens, and as in the previous case, products are moved one row after another starting from the middle rows and the above-mentioned action is repeated.

As described above, the device of the present invention distributes products a that are supplied one after another from the carrier conveyor A first by the conveyance-direction sorting guide 2, and then the conveyed products that are distributed at a speed relatively faster than the action of the first gate 6 are temporarily stocked at the product-distributing means 5 to prevent a holdup by accumulation of the products in front of the second gate 7. Thus, the products are distributed and collected properly at the second gate 7. After the collection, the second gate 7 descends to unload the products, so that the collected products can be carried to a prescribed after-treatment line at a high speed.

The present invention as described above can convey products a conveyed in a single row which are distributed and collected into a prescribed number of rows of a certain number of pieces each on a wide conveyor 1. After the products are temporarily blocked and collected at the first gate 6 (i.e., temporarily stocked), they are conveyed and collected properly in front of the second gate 7. Therefore, even if the distributing speed is increased and the following products are continuously sorted and distributed, it is possible to prevent a holdup of products caused by over accumulation as in the case of a conventional method. Products can be collected into multiple rows of a prescribed number at higher speed to increase production efficiency by speeding up after-treatment processes such as shrink-packaging.

In the present invention, conveyed products are temporarily collected and stocked in front of the first gate 6 before being conveyed to the second gate 7, in such a manner that only the last row of multiple rows of collected products of a prescribed number is conveyed to the second gate without being blocked by the first gate 6. In other words, the last row of products fed from the product-distributing means is not stopped by the first gate 6. This eliminates time loss and increases product-collecting speed in front of the second gate 7.

According to the present invention, the wide conveyor 1 conveys products a from a single-row condition until they are properly distributed and collected. This wide conveyor 1 is defined by multiple rows of small-diameter rollers 1a comprising multiple peripheral rollers $1a_2$ rotationally joined to shafts $1a_1$ by friction. There is therefore less influence caused by friction between the bottom of the products a and the surface of the wide conveyor 1. Even if the conveyed products are tall in relation to their bottom area, they can be intermittently or continuously conveyed and collected on the wide conveyor 1 in a stable manner without falling.

The product-distributing means 5 moves in a direction perpendicular to the conveyance direction of the wide conveyor 1 in the instant invention. Discharged products and especially products with a rectangular cross section are accurately and smoothly distributed and collected at higher speed in the same condition regardless of the row position, whether these products are at the end or middle of the multiple rows. The products are conveyed without an angle and a product-counting method can be used having sensors $5_5$. By blocking the light path of a sensor $5_5$, an accurate count of the products can be had.

According to the present invention, the conveyance-direction sorting guide 2 is defined by pipes $2a_3$ and shafts $2a_4$ so that the products a are smoothly guided from the guide to the vertical conveyors 3 that move in the direction perpendicular to the conveyance direction on the wide conveyor 1.

Drink packages are used as an example of conveyed products in the embodiment in which they are carried by a U-shaped blank to the after-treatment process where shrink-packaging is conducted, but the application of the invention is not restricted to the above embodiment. Bottled cosmetics or any conveyed products can be collected in a prescribed number of multiple rows of a certain number of pieces each for boxing or other after-treatment at high speed using this invention. Thus, it is possible to have more or less than six rows with more or less than three items each. The instant invention is especially advantageous for products with a rectangular cross section.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A distributing and collecting device for conveyed products, the device distributes and collects products sequentially supplied from a carrier conveyor, the products being distributed and collected into a prescribed number of rows in sets of a fixed amount of products, the device comprising:

a wide conveyor having a front end connected to an end of the carrier conveyor, the wide conveyor receiving products one after another from the carrier conveyor and extending generally along an entire length of the device;

a conveyance-direction sorting guide having a front end near the front end of the wide conveyor, the front end of the conveyance-direction sorting guide receiving products from the carrier conveyor and discharging the products at a rear end thereof, the conveyance-direction sorting guide being positioned above the wide conveyor and the rear end of the conveyance-direction sorting guide being oscillatable to move from one side of the wide conveyor to another side thereof;

product-distributing means for distributing the products into the rows, the product-distributing means having a pair of facing vertical conveyors above the wide conveyor, a front end of the vertical conveyors being connected to the rear end of the conveyance-direction sorting guide, the products being sandwiched between and conveyed by the vertical conveyors at generally a same speed the products are conveyed by the wide conveyor, the vertical conveyors discharging a prescribed number of products to an end row position on the wide conveyor, the vertical conveyors being movable with the conveyance-direction sorting guide to move from side to side of the wide conveyor to thereby discharge the products to different row positions on the wide conveyor, the products being sequentially discharged to adjacent row positions and the prescribed number of products being in each of the row positions;

a first gate movable between an opened and closed position, the first gate extending across the wide conveyor and being movable generally perpendicularly to a conveying direction, the first gate being a prescribed distance from the product-distributing means, at least some of the products being temporarily stored in multiple rows in front of the first gate; and a second gate a prescribed distance from the first gate, the second gate being vertically movable relative to the wide conveyor to move between an opened and closed position, the second gate blocking movement of the prescribed number of rows of products when in the closed position such that the products are held in the rows before being discharged from the device, the products being discharged from the device when the second gate is moved to the opened position.

2. The distributing and collecting device for conveyed products as recited in claim further comprising a pair of cylinder and guide rods mounted above the first gate, the first gate comprising two sections, each of the two sections having one guide rod with one cylinder attached thereto, the guide rods being movable to move the attached gate section in left and right directions such that the sections are moved perpendicularly to the conveying direction between the opened and closed positions.

3. The distributing and collecting device for conveyed products as recited in claim 1, wherein the first gate opens in both a left and right direction, the left and right directions being generally perpendicular to the conveying direction, the first and second gates are opened and closed in a coordinated manner, the vertical conveyors of the product-distributing means initially discharging products to one of the end row positions and then to adjacent rows such that the rows are sequentially filled with the prescribed number of products, the first gate being opened after a row is filled adjacent a last end row to be filled, the multiple rows of products moving along the wide conveyor to the second gate when the first gate is opened so that the prescribed number of products are accumulated at the second gate, the second gate being opened after the prescribed number of products have been accumulated and after the first gate is closed, the products being discharged from the device when the second gate is opened and the second gate being moved upwardly to the closed position when the prescribed number of products has been discharged from the device.

4. The distributing and collecting device for conveyed products as recited in claim 3, further comprising a sensor positioned downstream from the first gate, the sensor detecting passage of all of the prescribed number of products when the first gate is opened and thereafter issuing a signal received by the first gate, the first gate moving to the closed position when the signal from the sensor is received.

5. The distributing and collecting device for conveyed products as recited in claim 3, further comprising a sensor positioned downstream of the product-distributing means, the sensor counting a number of products discharged from the product-distributing means and upon discharge of the prescribed number of products for a row of products, the sensor issues a signal to the product-distributing means which then moves to discharge products to an adjacent row position.

6. The distributing and collecting device for conveyed products as recited in claim 3, further comprising first and second sensors, the first sensor being positioned downstream of the product-distributing means, the first sensor counting a number of products discharged from the product-distributing means and upon discharge of the prescribed number of products for a row of products, the first sensor issues a signal to the product-distributing means which then moves to discharge products to an adjacent row position, the second sensor being positioned downstream from the first gate, the second sensor detecting passage of all of the prescribed number of products when the first gate is opened and thereafter issuing a signal received by the first gate, the first gate moving to the closed position when the signal from the second sensor is received.

7. The distributing and collecting device for conveyed products as recited in claim 1, wherein the wide conveyor comprises a plurality of rollers, each roller having a shaft and a peripheral roller surrounding the shaft, the peripheral roller being frictionally engaged with the shaft and being movable relative to the shaft, the shafts and peripheral rollers being generally perpendicular to the conveying direction.

8. The distributing and collecting device for conveyed products as recited in claim 7, wherein each of the plurality of rollers is a small diameter roller and wherein the shafts are driven to rotate in the conveying direction.

9. The distributing and collecting device for conveyed products as recited in claim 1, wherein the product-distributing means comprises the pair of facing vertical conveyors and optical sensors, the vertical conveyors being movable in a direction generally perpendicular to the conveying direction from side to side of the wide conveyor, the optical sensors having a light path therebetween, the optical sensors being positioned on opposed sides of the wide conveyor downstream from the product-distributing means, products discharged by the product-distributing means crossing through the light path of the sensors and the sensors thereby counting the number of products discharged from the product-distributing means, upon the prescribed number of products being discharged to a row, the optical sensors causing the product-distributing means to move to distribute products to an adjacent row position.

10. The distributing and collecting device for conveyed products as recited in claim 1, wherein the product-distributing means comprises means for moving the vertical conveyors from side to side of the wide conveyor, the means for moving including a rail extending above the wide conveyor from one side to the other side thereof and a drive for moving the vertical conveyor along the rail from the one side to the other side of the wide conveyor.

11. The distributing and collecting device for conveyed products as recited in claim 10, wherein the drive comprises a ball screw attached to a frame board, the vertical conveyors being mounted on the frame board and the ball screw being operable to move the frame board and vertical conveyors across the wide conveyor.

12. The distributing and collecting device as recited in claim 11, further comprising at least one motor for driving the vertical conveyors, the at least one motor being movable with the vertical conveyors from side to side of the wide conveyor.

13. The distributing and collecting device for conveyed products as recited in claim 1, wherein the conveyance-direction sorting guide has mutually facing hinges at the front end thereof, the conveyance-direction sorting guide further having two sides between which the products move from the carrier conveyor to the product-distributing means.

14. The distributing and collecting device for conveyed products as recited in claim 13, wherein each of the two sides of the conveyance-direction sorting guide comprise a pipe and shaft which are telescopable to effectively elongate and shorten length of the conveyance-direction sorting guide in order to accommodate movement of the conveyance-direction sorting guide during oscillation between the sides of the wide conveyor.

15. The distributing and collecting device for conveyed products as recited in claim wherein the device further comprises a first sensor, a second sensor and wherein the first gate opens in both a left and right direction, the left and right directions being generally perpendicular to the conveying direction, the first and second gates are opened and closed in a coordinated manner, the vertical conveyors of the product-distributing means initially discharging products to one of the end row positions and then to adjacent rows such that the rows are sequentially filled with the prescribed number of products, the first gate being opened after a row is filled adjacent a last end row to be filled, the multiple rows of products moving along the wide conveyor to the second gate when the first gate is opened so that the prescribed number of products are accumulated at the second gate, the second gate being opened after the prescribed number of products have been accumulated and after the first gate is closed, the products being discharged from the device when the second gate is opened and the second gate being moved upwardly to the closed position when the prescribed number of products have been discharged from the device positioned downstream of the product-distributing means, the first sensor is positioned downstream of the product-distributing means, the first sensor counting a number of products discharged from the product-distributing means and upon discharge of the prescribed number of products for a row of products, the first sensor issues a signal to the product-distributing means which then moves to discharge products to an adjacent row position, the second sensor is positioned downstream from the first gate, the second sensor detecting passage of all of the prescribed number of products when the first gate is opened and thereafter issuing a signal received by the first gate, the first gate moving to the closed position when the signal from the second sensor is received, and wherein the wide conveyor comprises a plurality of small diameter rollers, each roller having a shaft and a peripheral roller surrounding the shaft, the peripheral roller being frictionally engaged with the shaft and being movable relative to the shaft, the shafts and peripheral rollers being generally perpendicular to and driven in the conveying direction.

16. The distributing and collecting device for conveyed products as recited in claim 15, wherein the product-distributing means comprises means for moving the vertical conveyors from side to side of the wide conveyor, the means for moving including a rail extending above the wide conveyor from one side to the other side thereof and a drive for moving the vertical conveyor along the rail from the one side to the other side of the wide conveyor, the drive comprises a ball screw attached to a frame board, the vertical conveyors being mounted on the frame board and the ball screw being operable to move the frame board and vertical conveyors across the wide conveyor.

17. The distributing and collecting device for conveyed products as recited in claim 16, wherein the conveyance-direction sorting guide has mutually facing hinges at the front end thereof, the conveyance-direction sorting guide further having two sides between which the products move from the carrier conveyor to the product-distributing means, each of the two sides of the conveyance-direction sorting guide comprise a pipe and shaft which are telescopable to effectively elongate and shorten length of the conveyance-direction sorting guide in order to accommodate movement of the conveyance-direction sorting guide during oscillation between the sides of the wide conveyor.

18. The distributing and collecting device as recited in claim 17, further comprising at least one motor for driving the vertical conveyors, the at least one motor being movable with the vertical conveyors from side to side of the wide conveyor.

* * * * *